United States Patent
Saunders

[15] 3,662,520
[45] May 16, 1972

[54] SYSTEM FOR GAS ANALYSIS AND MOLECULAR GAS SEPARATOR

[72] Inventor: Raymond A. Saunders, Hyattsville, Md.

[73] Assignee: The United States of America as represented by the Secretary of the Navy

[22] Filed: Oct. 24, 1969

[21] Appl. No.: 869,128

[52] U.S. Cl. .................................................55/158, 55/197
[51] Int. Cl. ..........................................................B01d 15/08
[58] Field of Search ..................210/321; 55/16, 67, 158, 197, 55/386

[56] References Cited

UNITED STATES PATENTS

| | | | |
|---|---|---|---|
| 3,274,750 | 9/1966 | Robb | 55/16 |
| 3,279,154 | 10/1966 | Emerson et al. | 55/158 |
| 3,421,292 | 1/1969 | Llewellyn | 55/197 X |
| 3,422,008 | 1/1969 | McLain | 55/16 X |
| 3,495,943 | 2/1970 | Kapff | 210/321 X |

*Primary Examiner*—J. L. Decesare
*Attorney*—R. S. Sciascia, Arthur L. Branning, R. J. Erickson and W. M. O'Brien

[57] ABSTRACT

A system for gas analysis including an open tubular gas chromatographic column coupled to a gas analyzer through a diffusion type molecular gas separator and gas flow channeling which extends from the exit of the chromatographic column through the molecular gas separator and has the same or nearly the same cross section for gas flow as the chromatographic column. In this system, carrier gas is separated from the organic components to give component-enriched gas samples for delivery to the gas analyzer and without loss of the fine separation of the organic components effected in the chromatographic column.

5 Claims, 5 Drawing Figures

INVENTOR
RAYMOND A. SAUNDERS

PATENTED MAY 16 1972　3,662,520

INVENTOR
RAYMOND A. SAUNDERS

BY
ATTORNEYS

SYSTEM FOR GAS ANALYSIS AND MOLECULAR GAS SEPARATOR

STATEMENT OF GOVERNMENT INTEREST

The invention described herein may be manufactured and used by or for the Government of the United States of America for governmental purposes without the payment of any royalties thereon or therefor.

This invention relates to a system for vapor phase analysis of organic component mixtures using an open tubular gas chromatographic column and a gas analyzer for identification of the organic components. More particularly, it is concerned with an improved device for processing the effluent from the chromatographic column to effect a diffusion type molecular gas separation of organic constituents from the carrier gas for delivery of constituent-enriched gas samples to the gas analyzer.

PRIOR ART

The desirability of a system for gas analysis which involves the combined use of gas chromatography and mass spectrometry has been recognized. Ryhage, Analytical Chemistry, 36, June 1965, pp. 844–851. In these systems a device serves to connect the exit of the gas chromatographic column at atmospheric pressure with the mass spectrometer operating at low pressure and, through separation of carrier gas from the effluent from the chromatographic column, to provide gas samples enriched in the organic constituent (eluate) for entry into the mass spectrometer. A system of this kind in which the gas chromatographic column is coupled to a mass spectrometer through a diffusion-type molecular gas separator which separates the carrier gas from the organic constituents to provide organic constituent-enriched gas samples for entry into the mass spectrometer is described in the Llewellyn U.S. Pats. No. 3,398,505, 3,421,292 and 3,429,105. In this system, a membrane of nonporous material which is permeable to organic components is used as the diffusion-barrier through which the organic components pass to reach the inlet of the mass spectrometer operating under low pressure. Only a relatively small proportion of the carrier gas will diffuse through the membrane with the greatest part passing by and being exhausted from the system into the atmosphere. This type system is lower in cost and has a higher efficiency than those in which the carrier gas is exhausted to a vacuum.

The prior art systems for gas analysis of organic mixtures using gas chromatography and mass spectrometry and a molecular gas separation device for delivery of component-enriched gas samples to the mass spectrometer are subject to the disadvantage of loss in the gas samples of the fine component resolution achieved in the chromatographic column. A source of this loss may be remixing of components due to turbulent flow in the effluent stream. Turbulent flow may arise from an abrupt change in the rate of flow of the stream or from a significant narrowing of the flow channel in the direction of flow. Another source of this loss is when the effluent stream is in laminar flow and moves into a succeeding gas flow channel of significantly greater volume. Lateral spreading of the gas stream drastically reduces its velocity and in consequence the distance between the components, timewise, is extinguished or is diminished to such an extent that a time interval necessary for discrete recording of the components at the gas analyzer does not exist.

It is an object of the present invention to provide an improved diffusion type molecular gas separator for providing organic component-enriched gas samples without loss of the resolution of the components attained in the gas chromatographic column.

It is another object to provide an improved coupling between a diffusion type molecular gas separator and an open tubular chromatographic column for delivery of organic component-enriched gas samples to a gas analyzer.

It is a further object to provide a system for gas analysis which includes an open tubular gas chromatographic column and a mass spectrometer which are operatively connected through an improved coupling including a diffusion type molecular gas separator for delivery of organic component-enriched gas samples to the mass spectrometer.

SUMMARY OF THE INVENTION

The above and other objects are accomplished in the system of the present invention which comprises, broadly stated, an improved molecular gas separation device which is adapted to interconnect an open tubular chromatographic column with a mass spectrometer for delivery to the latter of organic component-enriched gas samples and in a manner that the fine separation of the organic components effected in the gas chromatographic column is retained for the samples.

The molecular gas separation device of the present invention comprises a vacuum-tight tubular housing in which is mounted a nonporous membrane which is permeable to organic components, e.g., hydrocarbons, but highly impermeable to the carrier gas, e.g., helium. A gas passageway extends through the gas separator by which effluent from the open tubular chromatographic column flows into contact with and along one side of the membrane and carrier gas is discharged from the system into the atmosphere. The organic components diffuse through the membrane and leave on the distal side to flow into the inlet to the mass spectrometer which, working under low pressure, establishes a pressure gradient across the membrane which promotes this flow. The inlet to the molecular gas separator may be connected directly to the exit of the chromatographic column by means of suitable fittings and, if desired, also with the use of metal tubing extending therebetween.

The improved system of the invention is characterized further by the fact that the gas flow channeling from the exit of the chromatographic column to and through the molecular gas separator is of constant or nearly constant cross section for gas flow which in magnitude is the same or nearly the same as the cross section for gas flow of the open tubular chromatographic column. The use of gas flow channeling of a constant or nearly constant cross section as above defined avoids the occurrence of turbulent flow in an effluent stream moving at constant velocity. It also obviates the situation where the velocity of the moving effluent stream is suddenly and drastically reduced whereby the component separation therein, timewise, is extinguished or practically so.

DESCRIPTION OF DRAWINGS

The invention will be more fully understood from the following description when read with the accompanying drawings in which like numerals include like parts and.

PREFERRED EMBODIMENTS

Figure 1:
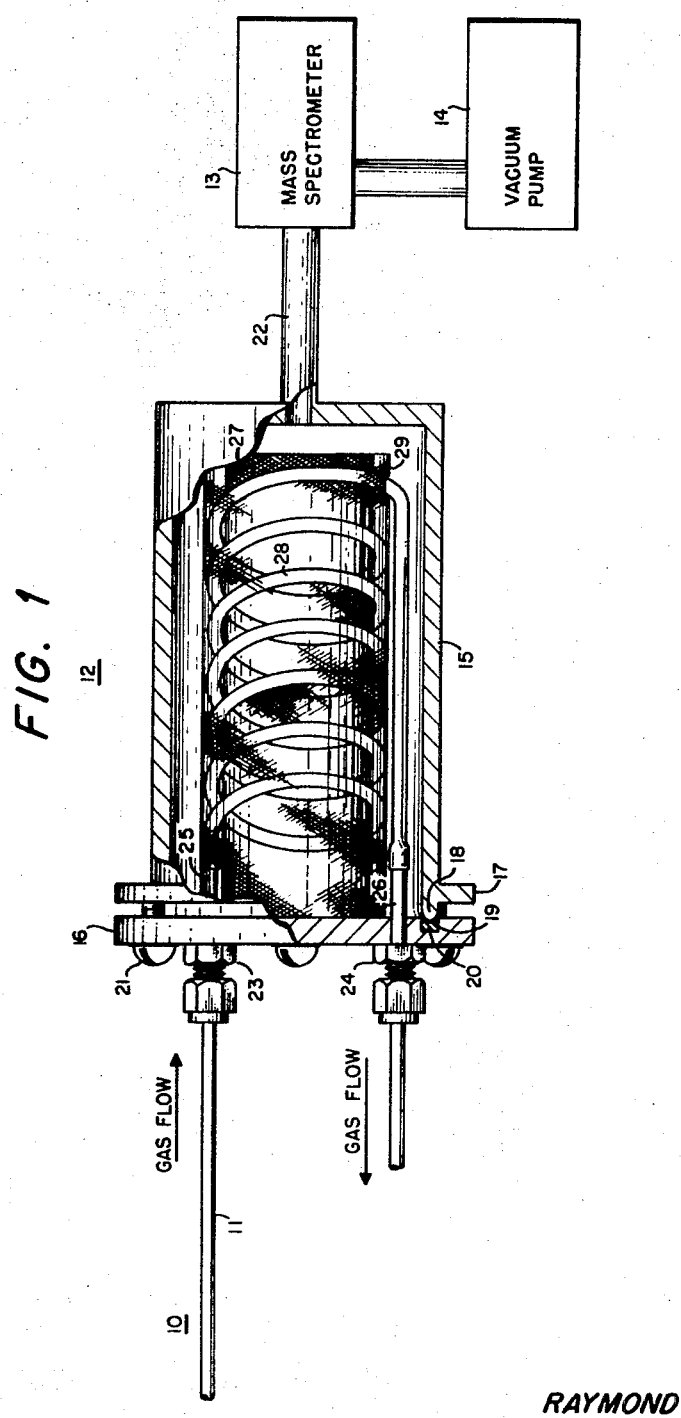
FIG. 1 is a view partly in section of a preferred embodiment of a molecular gas separator in accordance with the invention arranged in a gas analysis system.

Referring to FIG. 1 of the drawing, a gas chromatograph which may be of conventional design is shown generally at 10 and has an open tubular chromatographic column 11. The column 11 is connected through the molecular gas separation device 12 of the invention with a mass spectrometer 13 which may be of conventional design, for example, a rapid scanning mass spectrometer. A vacuum pump 14 is connected to the mass spectrometer for operation of the latter at low pressures, e.g., at about $10^{-5}$ to $10^{-6}$ torr.

The chromatographic column 11 may vary considerably in length, for example, from about 50 to 300 feet, and be supported by coiling about a stainless steel tube on which it is retained with the assistance of a lengthwise extending metal strap (not shown) which is rebent to extend into the interior of the tube. Preferably the chromatographic column is support coated open tubular (SCOT). A SCOT column is typically 0.020 inch in internal diameter.

The molecular gas separator 12 comprises a stainless steel housing which, generally stated, comprises a tubular shell 15 and a circular cover plate 16. A circumferential flange 17, the outer diameter of which may match the diameter of cover plate 16, extends about the shell 15 at the upper end and defines a circular lip portion 18. The cover plate is provided with a circular groove on the under side at 19 to seat a vacuum-sealing ring 20 of soft metal such as silver. The cover plate 16 and the flange 17 are machined to accommodate a plurality of machine screw-bolts 21 which thread into the flange 17. In the assembled and locked position, these parts provide a vacuum-tight seal at the upper end of the housing as shown. At the lower end of the housing, a tube 22, integral with the shell 15, serves with a fitting (not shown) to connect the molecular gas separator 12 with the mass spectrometer 13 in vacuum-tight relationship.

Identical fittings 23 and 24 are welded to the upper surface of the cover plate 16. These fittings have attached thereto a short length of stainless steel tubing, 25 and 26, respectively. A tubular wire mesh screen 27 of stainless steel is welded to the under surface of the cover plate 16. This tubular screen serves as the mandrel or support for a length of silicone rubber tubing 28 which is spirally wound about it. A tubular wire screen sleeve 29 may be slipped over the silicone rubber tubing wound about the mandrel to assist in holding the rubber tubing in place on the mandrel. The silicone rubber tubing is in gas flow communication at the one end with the metal tubing 25 and at the other end with the metal tubing 26. The length of the silicone rubber tubing may vary considerably and, generally, lengths of from about 4 to 20 inches will suffice for the gas analysis. The internal diameter of the fittings, 23 and 24, of the tubing 25 and 26 and of the silicone rubber tubing 28 is the same or nearly the same as the internal diameter of the chromatographic column 11.

In operation of the system using the molecular gas separator 12 as shown in FIG. 1, a gas mixture of, for example, 1 part hexane and 1 part heptane per 10,000 parts helium, by volume, is flowed under positive pressure into a SCOT chromatographic column 11 of 0.020 inch internal diameter and 50 feet in length. The effluent gas from the chromatographic column 11 flows through the line 23 and the silicone rubber tubing 27, both of which have the same inner diameter as the column 11. In flowing through the silicone rubber tubing 27, the hexane and heptane, by reason of being soluble in the silicone rubber, permeate or pass through the silicone rubber tubing wall, which may be of about 5–10 mil thickness, along with a small amount of helium, to constitute organic component-enriched gas samples. These gas samples pass by line 22 under the influence of a vacuum of about $10^{-6}$ torr, into the mass spectrometer 13 for identification of the hydrocarbons. The helium separated from the hydrocarbons is discharged into the ambient atmosphere by way of line 24. By using the same cross-sectional area for the gas flow from the exit of the chromatographic column 11 to and through the silicone rubber tubing 27 and observing a steady rate for this gas flow, turbulence and mixing in the gas stream are avoided and, resultingly, also, loss of the fine resolution of the hydrocarbons in the gas stream which is achieved in the chromatographic column.

Figure 2:
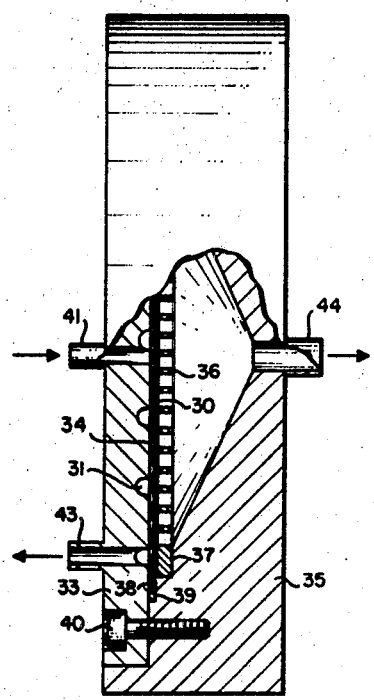
FIG. 2 is a like view of another embodiment of a molecular gas separator in accordance with the invention.
Figure 3:
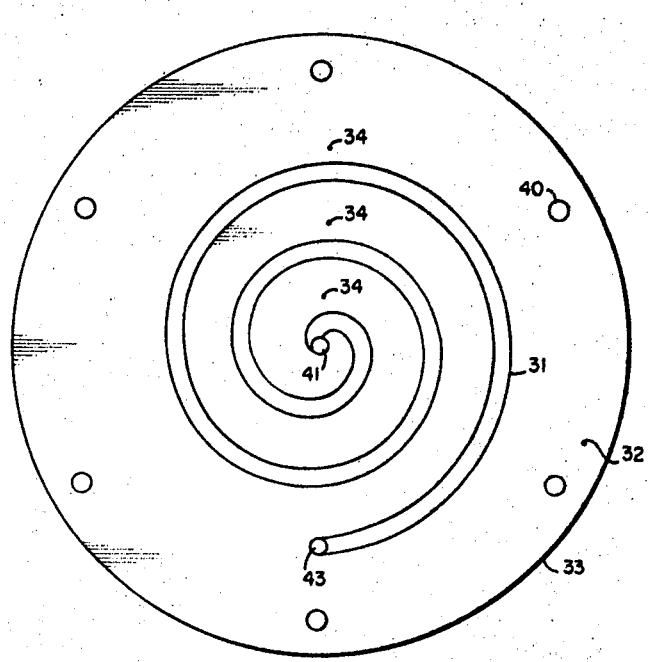
FIG. 3 is a face view of a grooved plate forming part of the gas channeling in the molecular gas separator of FIG. 2.
Figure 4:
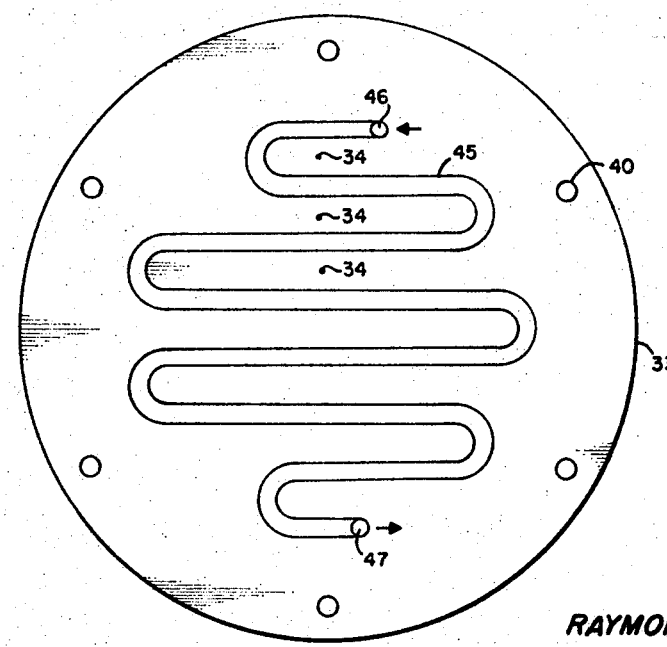
FIG. 4 is a like view of a further embodiment of a grooved plate forming part of the gas channeling in the molecular gas separator of FIG. 2.

In the embodiment of the molecular gas separator shown in FIG. 2, the membrane 30 is a flat circular sheet of nonporous material which is permeable to organic vapors, for example, hydrocarbons, but highly nonpermeable to a carrier gas and may be a sheet of nonporous silicone rubber of about 5 to 30 mils thickness. The channeling for flow of the gas mixture to the membrane 30 is a circulinear groove 31 of curved cross section, for example, hemispherical, engraved in one face 32 of a stainless steel plate 33. The cross-sectional area of the groove 31 is of a single magnitude and is the same or nearly the same in cross-sectional area for gas flow as that of the gas chromatographic column 11. The membrane 30 is arranged in contact with the land portions 34 of the face 32 of the metal plate 33 to lie in juxtaposed position and in gas-tight relationship with the metal plate 33. The membrane 30 is brought into contact with the land portions of the plate 33 by means of the tubular metal housing 35, a perforated metal disc 36 seated in the circular groove 37 in the housing 35 and a vacuum-sealing ring 38 of a soft metal such as silver which is seated in the circular groove 39 in the housing 35. This assembly is held in the secured position and gas-tight relationship by means of a plurality of Allen head cap screws 40 which are threaded through the metal plate 33 and into the tubular metal housing 35.

In operation of the molecular gas separator shown in FIG. 2, the gas mixture of hydrocarbons and helium as described above is flowed from the exit of the gas chromatographic column through the inlet tube 41 into the gas channeling made up of the circulinear grooving 31 and the adjacent portions of the membrane 30 whereby the gas mixture flows along the near face of the membrane 30 and, after passage of the hydrocarbons and a small amount of the helium through the membrane to the distal side thereof, the residue or separated carrier gas from the gas mixture flows out of the molecular gas separator into the ambient atmosphere at 43. The gas samples enriched in the hydrocarbon leave the separator from the distal side of the membrane 30 by way of the tubing 44 which leads to the mass spectrometer 12 operating under reduced pressure through the action of the vacuum pump 14 as described above with reference to the operation of the molecular gas separator shown in FIG. 1. The tubular housing 35 is conically or dish-shaped at the exit side for the gas samples to promote ease in gas flow.

In place of a gas path which is circulinear one may use other gas paths across the face of the permeable diaphragm or membrane 30 provided a substantial area of gas flow contact is presented to the membrane 30. Thus, for example, the gas path may be of serpentine design 45 milled into one face of the metal plate 33 with an inlet at 46 and an exit at 47.

Figure 5:
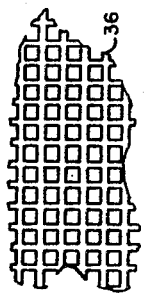
FIG. 5 is a detail view of a perforated metal plate forming part of the molecular gas separators of FIG. 1 and FIG. 2.

The perforated metal plate or disc 36 for support of the membrane 30 in the tubular housing 35 is shown in detail in FIG. 5. The construction of this plate should be such that it is stiff enough to cause the membrane 30 to be brought into gas-tight registry with the lands of the metal plate 33 when the molecular gas separator is in the assembled and operational state. Suitably, the stainless steel circular plate 36 is about 80 mils thick, the perforations therein are about one-sixteenth inch square and the connecting areas about 35 mils thick.

While the invention has been described herein by reference to certain specific embodiments thereof, these are intended by way of illustration and not in limitation except as may be defined in the appended claims.

What is claimed and desired to be secured by letters patent of the United States is:

1. In a gas analysis system comprising an open tubular gas chromatographic column in gas flow communication with a mass spectrometer through a molecular gas separator having a nonporous membrane permeable to organic vapors and highly impermeable to carrier gas, and gas channeling means from the exit of said chromatographic column through said molecular gas separator to one side of said membrane, said gas channeling means including a curved conduit for gas flow therein, the improvement which comprises said gas channeling having a cross-sectional area for gas flow therein which is substantially the same as that of said chromatographic column.

2. A gas analysis system as defined in claim 1, wherein the nonporous membrane is a tubing forming part of the gas channeling means.

3. A gas analysis system as defined in claim 1, wherein the nonporous membrane is a silicone rubber tubing forming part of the gas channeling means.

4. A gas separation device comprising:

a tubular housing, means for closing one end of said housing with a vacuum seal, means in said housing including a flat nonporous membrane permeable to organic vapors but highly impermeable to carrier gas for diffusion separation of an organic component from a gas mixture containing the same and a carrier gas, said means including a metal plate having channeling means extending over a substantial area of one face thereof, said channeling means having a substantially constant internal cross-sectional area per unit of length for gas flow therein, said flat nonporous membrane and the land portion of said channeled metal face being arranged in juxtaposed and gas-tight relationship whereby a gas mixture flowing in said channeling means is brought into contact with the near side of said mixture, means for permitting low pressure to be exerted on the distal side of said membrane and for withdrawing an organic component of the gas mixture from said housing, and means for discharging separated carrier gas from said housing and the near side of said membrane.

5. A gas separation device as defined in claim 4, wherein the channeling in the face of the metal plate is circulinear.

* * * * *